(12) United States Patent
Kim et al.

(10) Patent No.: US 12,709,556 B2
(45) Date of Patent: Aug. 18, 2026

(54) UV REACTION APPARATUS FOR TREATING WASTE LIQUID CAUSED BY SYSTEM DECONTAMINATION IN NUCLEAR POWER PLANT

(71) Applicant: KOREA HYDRO & NUCLEAR POWER CO., LTD, Gyeongju-si Gyeongsangbuk-do (KR)

(72) Inventors: Cho Rong Kim, Daejeon (KR); Hak Soo Kim, Sejong (KR); Jeong Ju Kim, Gyeryong-si (KR); Sang Ho Lee, Sejong (KR); Eun Hee Hong, Daejeon (KR); Ji Eun Park, Sejong (KR); Ka Hee Jeong, Daejeon (KR)

(73) Assignee: KOREA HYDRO & NUCLEAR POWER CO., LTD, Gyeongsangbuk-do (KR)

( * ) Notice: Subject to any disclaimer, the term of this patent is extended or adjusted under 35 U.S.C. 154(b) by 352 days.

(21) Appl. No.: 18/258,425

(22) PCT Filed: Mar. 4, 2022

(86) PCT No.: PCT/KR2022/003096
§ 371 (c)(1),
(2) Date: Jun. 20, 2023

(87) PCT Pub. No.: WO2022/220404
PCT Pub. Date: Oct. 20, 2022

(65) Prior Publication Data

US 2024/0034646 A1 Feb. 1, 2024

(30) Foreign Application Priority Data

Apr. 15, 2021 (KR) ........................ 10-2021-0048956

(51) Int. Cl.
*C02F 1/32* (2023.01)
*C02F 101/30* (2006.01)
*C02F 103/34* (2006.01)

(52) U.S. Cl.
CPC .......... *C02F 1/325* (2013.01); *C02F 2101/30* (2013.01); *C02F 2103/34* (2013.01);
(Continued)

(58) Field of Classification Search
CPC C02F 1/325; C02F 2301/046; C02F 2101/30; C02F 2103/34; C02F 2201/322; C02F 2209/20
See application file for complete search history.

(56) References Cited

U.S. PATENT DOCUMENTS 4,769,131 A * 9/1988 Noll ........................ C02F 1/325 210/748.11
5,004,541 A 4/1991 Noll et al.
(Continued)

FOREIGN PATENT DOCUMENTS

CN 108793317 A 11/2018
GB 2570818 A 8/2019
(Continued)

OTHER PUBLICATIONS

Partial Supplementary European Search Report dated Aug. 21, 2024 issued in corresponding European Appln. No. 22788261.0.
(Continued)

*Primary Examiner* — Sean Luck
(74) *Attorney, Agent, or Firm* — HARNESS, DICKEY & PIERCE, P.L.C.

(57) ABSTRACT

Provided is a UV reaction apparatus for treating waste liquid caused by system decontamination in a nuclear power plant. The UV reaction apparatus comprises a UV irradiation unit for irradiating UV light as a bar-shaped body; and a transit
(Continued)

unit accommodating the UV irradiation unit therein, and for passing organic waste liquid to be irradiated with the UV light, wherein the transit unit comprises, an input unit, into which the organic waste liquid is input a discharge unit, through which the organic waste liquid is discharged, and an intermediate unit located between the input unit and the discharge unit, and in which the UV irradiation unit is located.

5 Claims, 3 Drawing Sheets

(52) U.S. Cl.
CPC .... *C02F 2201/322* (2013.01); *C02F 2209/20* (2013.01); *C02F 2301/046* (2013.01)

(56) References Cited

U.S. PATENT DOCUMENTS

| | | | | |
|---|---|---|---|---|
| 5,707,594 | A * | 1/1998 | Austin | A23B 2/704 422/186.3 |
| 5,785,845 | A * | 7/1998 | Colaiano | C02F 1/78 210/167.3 |
| 6,932,903 | B2 * | 8/2005 | Chang | C02F 9/00 422/186.3 |
| 6,932,947 | B2 * | 8/2005 | Leung | B01J 19/006 422/186.3 |
| 7,306,716 | B2 * | 12/2007 | Baarman | C02F 1/325 250/435 |
| 7,862,728 | B2 | 1/2011 | Yencho | |
| 8,541,758 | B1 * | 9/2013 | Filson, II | A61L 9/20 250/455.11 |
| 10,570,029 | B2 * | 2/2020 | Arbeus | C02F 1/78 |
| 2008/0179178 | A1 | 7/2008 | Cabello et al. | |
| 2009/0145855 | A1 * | 6/2009 | Day | C02F 1/325 210/748.14 |
| 2011/0318237 | A1 | 12/2011 | Woodling et al. | |
| 2016/0207795 | A1 | 7/2016 | Hanada | |

FOREIGN PATENT DOCUMENTS

| | | | |
|---|---|---|---|
| JP | H04278444 | A | 10/1992 |
| JP | H07287095 | A | 10/1995 |
| JP | H11-138156 | A | 5/1999 |
| JP | 2000-317444 | A | 11/2000 |
| JP | 2001-038349 | A | 2/2001 |
| JP | 2001-091692 | A | 4/2001 |
| JP | 2001-212214 | A | 8/2001 |
| JP | 2003-145146 | A | 5/2003 |
| JP | 2004-325177 | A | 11/2004 |
| KR | 10-2003-0008073 | A | 1/2003 |
| KR | 2008-0050316 | A | 6/2008 |
| KR | 2012-0101008 | A | 9/2012 |
| KR | 101860002 | B1 | 5/2018 |
| KR | 101999845 | B1 | 7/2019 |
| TW | 200920416 | A | 5/2009 |
| TW | 201200474 | A | 1/2012 |
| WO | 2015/046014 | A1 | 4/2015 |
| WO | WO-2019-007788 | A1 | 1/2019 |

OTHER PUBLICATIONS

Written Opinion for International Patent Application No. PCT/KR2022/003096 dated Jun. 13, 2022.

International Search Report for International Patent Application No. PCT/KR2022/003096 dated Jun. 13, 2022.

Extended European Search Report dated Nov. 7, 2024 issued in corresponding European Patent Appln. No. 22788261.0.

Japanese Office Action dated Apr. 23, 2024 issued in corresponding Japanese Appln. No. 2023-536855.

Chinese Office Action dated Sep. 13, 2025 issued in corresponding Chinese Patent Appln. No. CN 202280008253.6.

* cited by examiner

UV REACTION APPARATUS FOR TREATING WASTE LIQUID CAUSED BY SYSTEM DECONTAMINATION IN NUCLEAR POWER PLANT

CROSS-REFERENCE TO RELATED APPLICATIONS

This application is a national phase under 35 U.S.C. § 371 of PCT International Application No. PCT/KR2022/003096 which has an International filing date of Mar. 4, 2022, which claims priority to Korean Patent Application No. 10-2021-0048956, filed Apr. 15, 2021, the entire contents of each of which are hereby incorporated by reference.

This application claims the benefit of Korean Patent Application No. 10-2021-0048956, filed on Apr. 15, 2021, in the Korean Intellectual Property Office, the disclosure of which is incorporated herein by reference in its entirety.

BACKGROUND

1. Field

The present invention relates to a UV reaction apparatus for treating waste liquid caused by system decontamination in a nuclear power plant.

2. Description of the Related Art

In the case of waste liquid generated after system decontamination in a nuclear power plant, it flows into the UV reaction apparatus, which is a waste liquid decomposition and treatment apparatus. The organic waste liquid passed through the filter passes through the UV reaction apparatus, and after passing through, moves to the buffer tank to remove $CO_2$ gas. At this time, TOC analysis is performed by sampling at the front and rear ends of the UV reaction apparatus. In order to improve the decomposition of the organic waste liquid, it is necessary to increase the contact frequency or the contact time in the UV reaction apparatus of the waste liquid decomposition and treatment device.

SUMMARY

The problem to be solved by the present invention is that since the contact time is short as the organic waste liquid passes vertically or horizontally into the reaction apparatus, the total waste liquid decomposition time increases, and in order to solve this problem, it is to provide a UV reaction apparatus for treating waste liquid caused by system decontamination in a nuclear power plant.

In addition, it is to provide a UV reaction apparatus for treating waste liquid caused by system decontamination in a nuclear power plant capable of improving waste liquid decomposition performance by shortening the waste liquid decomposition time by increasing the UV lamp contact time.

In addition, it is to provide a UV reaction apparatus for treating waste liquid caused by system decontamination in a nuclear power plant for shortening the waste liquid decomposition process time through the process, in which, as the waste liquid decomposed by more than 90% by the circulation process between the buffer tank and the UV reaction apparatus flows into the system, the organic waste liquid of the system is diluted and the concentration is lowered.

In addition, it is to provide a UV reaction apparatus for treating waste liquid caused by system decontamination in a nuclear power plant capable of improving the decomposition rate by increasing the contact time and the contact frequency to supplement the limitations of the existing organic acid decomposition process.

In order to achieve the above object, a UV reaction apparatus for treating waste liquid caused by system decontamination in a nuclear power plant according to one aspect of the present invention comprises a UV irradiation unit for irradiating UV light as a bar-shaped body; and a transit unit provided on the UV irradiation unit and for allowing filled organic waste liquid to be irradiated with the UV light, wherein the transit unit comprises, an input unit, into which the organic waste liquid is input, a discharge unit, through which the organic waste liquid is discharged, and an intermediate unit located between the input unit and the discharge unit and provided in a coil shape in a height direction of an outer circumferential surface of the UV irradiation unit.

In addition, at least a length value of the intermediate unit has a larger value than a length value of the UV irradiation unit so that time, during which the organic waste liquid passing through the intermediate unit is exposed to the UV light, is extended.

In order to achieve the above object, a UV reaction apparatus for treating waste liquid caused by system decontamination in a nuclear power plant according to another aspect of the present invention comprises a UV irradiation unit for irradiating UV light as a bar-shaped body; and a transit unit accommodating the UV irradiation unit therein, and for passing organic waste liquid to be irradiated with the UV light, wherein the transit unit comprises, an input unit, into which the organic waste liquid is input, a discharge unit, through which the organic waste liquid is discharged, and an intermediate unit located between the input unit and the discharge unit, and in which the UV irradiation unit is located.

In addition, the UV irradiation unit is provided in plural so as to be adjacent to each other, a plurality of piece-shaped partition wall units are provided on an inner circumferential surface of the intermediate unit, and the partition wall unit allows the organic waste liquid input on an inner circumferential surface of the intermediate unit to stagnate in the intermediate unit so that time, during which the organic waste liquid is exposed to the UV light, is extended.

In addition, the UV reaction apparatus further comprises a buffer tank for performing circulation operation with the transit unit, wherein the buffer tank, into which the organic waste liquid irradiated with the UV light is input, and inputs the input organic waste liquid into the transit unit to increase frequency of exposure of the organic waste liquid to the UV light on the transit unit.

In addition, the UV reaction apparatus further comprises an analysis unit for obtaining a total organic carbon (TOC) analysis value of the organic waste liquid on the transit unit, wherein the circulation operation is repeated until the analysis value reaches a preset value.

In addition, the UV reaction apparatus further comprises a first flow path, a second flow path connected at the first flow path and for supplying the organic waste liquid to a filter unit, a filter unit for filtering the organic waste liquid supplied through the second flow path, and supplying the filtered organic waste liquid to the transit unit, a third flow path for supplying the organic waste liquid from the filter unit to the transit unit, a fourth flow path for supplying the organic waste liquid from the transit unit to the buffer tank, a fifth flow path for supplying the organic waste liquid from the buffer tank to the transit unit, a sixth flow path for supplying the organic waste liquid from the buffer tank to the first flow path, and a pump for pumping the organic waste liquid supplied from the buffer tank to the transit unit.

According to the UV reaction apparatus of the present invention as described above, there are one or more of the following effects.

According to the present invention, there is a problem that the total waste liquid decomposition time increases due to the short contact time as the organic waste liquid passes vertically or horizontally into the reaction apparatus, and it is possible to provide a UV reaction apparatus for treating waste liquid caused by system decontamination in a nuclear power plant in order to solve this problem.

In addition, it is possible to provide a UV reaction apparatus for treating waste liquid caused by system decontamination in a nuclear power plant capable of improving waste liquid decomposition performance by shortening the waste liquid decomposition time by increasing the UV lamp contact time.

In addition, it is possible to provide a UV reaction apparatus for treating waste liquid caused by system decontamination in a nuclear power plant for shortening the waste liquid decomposition process time through the process, in which as the waste liquid decomposed by more than 90% by the circulation process between the buffer tank and the UV reactor flows into the system, the organic waste liquid of the system is diluted and the concentration is lowered.

In addition, it is possible to provide a UV reaction apparatus for treating waste liquid caused by systemic decontamination in a nuclear power plant capable of improving the decomposition rate by supplementing the limitations of the existing organic acid decomposition process by increasing the contact time and the contact frequency.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
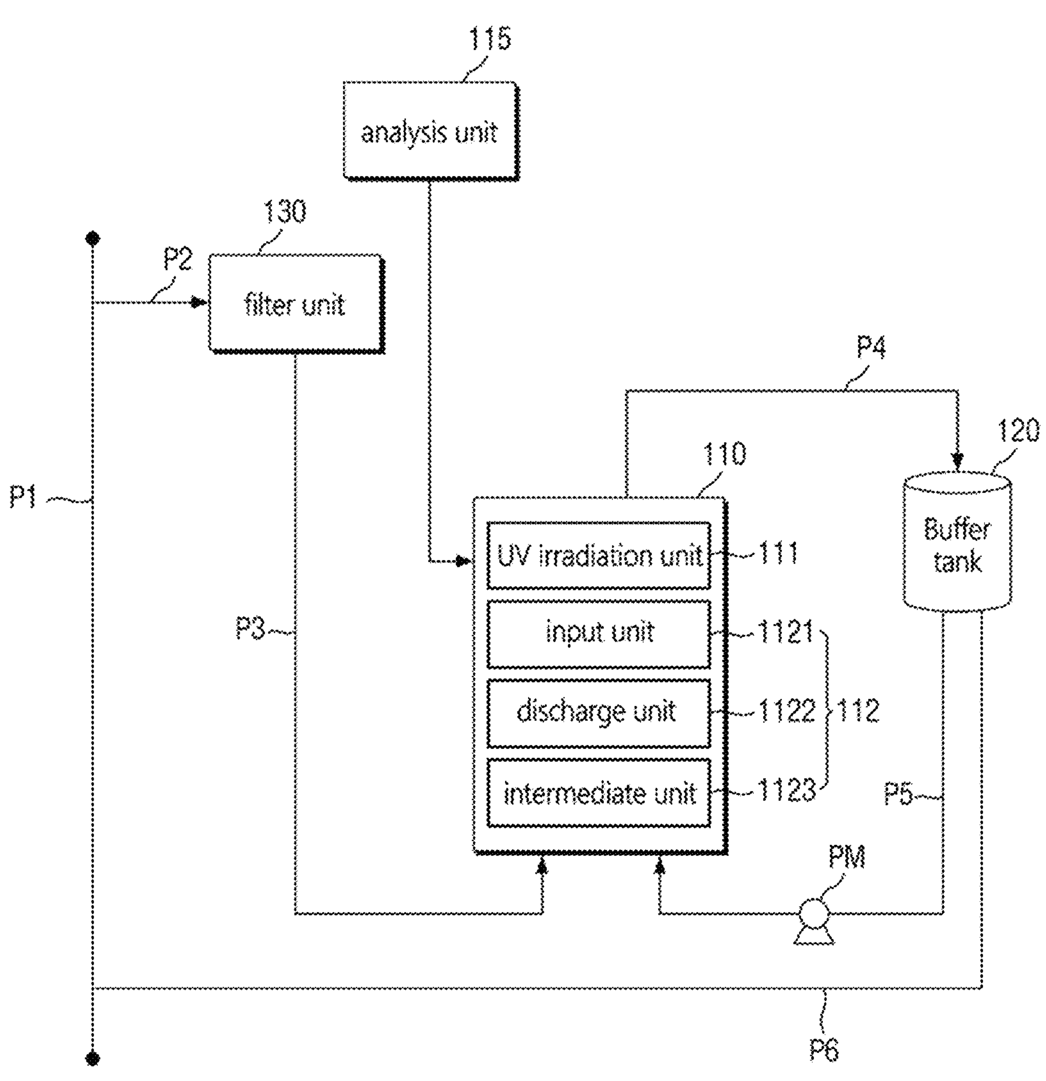
FIG. 1 is a diagram showing a UV reaction apparatus according to an embodiment of the present invention.

Hereinafter, preferred embodiments of the present invention will be described in detail with reference to the accompanying drawings. Advantages and features of the present invention and methods of achieving them will become apparent with reference to the embodiments described below in detail in conjunction with the accompanying drawings. However, the present invention is not limited to the embodiments described below, but may be implemented in various different forms, and these embodiments are provided only for making the description of the present invention complete and fully informing those skilled in the art to which the present invention pertains on the scope of the invention, and the present invention is only defined by the scope of the claims. Like reference numerals refer to like elements throughout.

Figure 2:
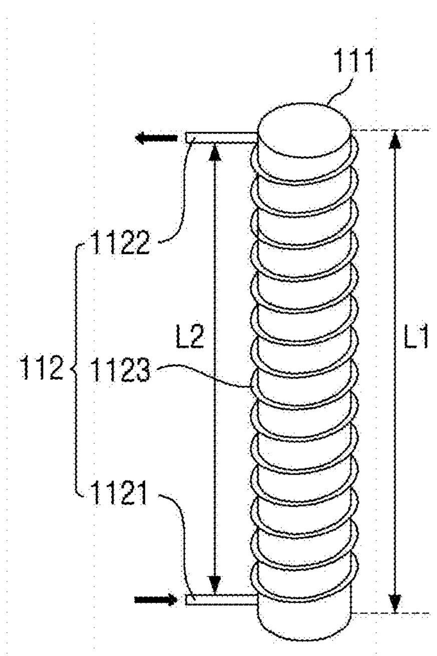
FIG. 2 is a diagram showing the configuration according to FIG. 1.

FIG. 1 is a diagram showing a UV reaction apparatus according to an embodiment of the present invention. FIG. 2 is a diagram showing the configuration according to FIG. 1.

Referring to FIGS. 1 and 2, a UV reaction apparatus for treating waste liquid caused by system decontamination in a nuclear power plant according to an embodiment of the present invention may comprise a UV reaction apparatus 110 and a buffer tank 120. Here, the UV reaction apparatus 110 may include a UV irradiation unit 111, a transit unit 112, and the transit unit 112 may include an input unit 1121, a discharge unit 1122, and an intermediate unit 1123.

Here, the UV irradiation unit 111 may irradiate UV light as a bar-shaped body. The transit unit 112 may be provided on the UV irradiation unit 111. The transit unit is for irradiating the filled organic waste liquid with the UV light.

The input unit 1121 of the transit unit 112 may allow the organic waste liquid to be input. The discharge unit 1122 of the transit unit 112 may allow the organic waste liquid to be discharged.

The intermediate unit 1123 of the transit unit 112 may be located between the input unit 1121 and the discharge unit 1122. The intermediate unit 1123 may be provided in a coil shape in a height direction of an outer circumferential surface of the UV irradiation unit 111.

Here, the intermediate unit 1123 may have a length value greater than at least the length value of the UV irradiation unit 111. Through this, the exposure time of the organic waste liquid passing through the intermediate unit 1123 to the UV light can be extended.

In addition, the partition wall unit 1231 is designed so that the width of the arrangement becomes narrower from the input unit to the discharge unit, and this is to consider the pressure when the flow rate is introduced from the input unit.

Figure 3:
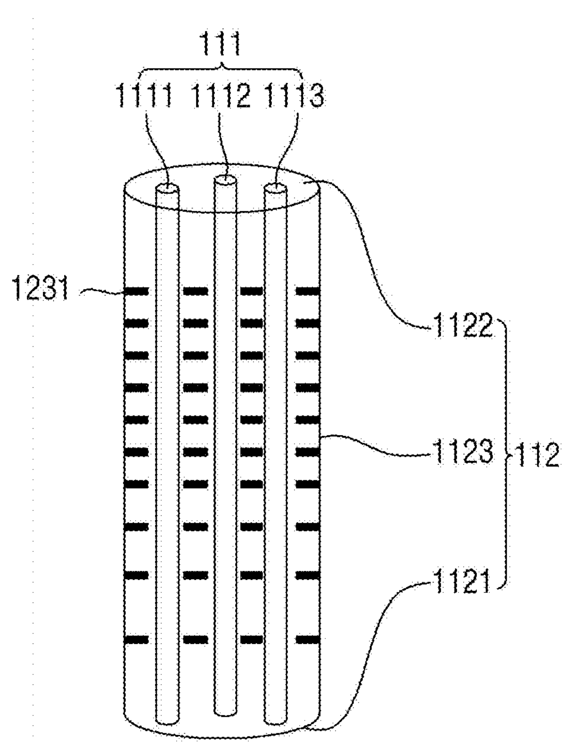
FIG. 3 is a diagram showing another embodiment of the configuration according to FIG. 1.

FIG. 3 is a diagram showing another embodiment of the configuration according to FIG. 1. Hereinafter, description will be made based on the above-described embodiment, but focusing on technical features.

Referring to FIGS. 1 and 3, a UV reaction apparatus according to another embodiment of the present invention may comprise a UV irradiation unit 111, a transit unit 112, and a buffer tank 120, similarly to the above embodiment. The transit unit 112 may comprise an input unit 1121, a discharge unit 1122, an intermediate unit 1123, a first flow path P1, a second flow path P2, a third flow path P3, a fourth flow path P4, a fifth flow path P5 and a sixth flow path P6.

Here, the transit unit 112 may accommodate the UV irradiation unit 111 therein. The transit unit 112 is to pass through the organic waste liquid to be irradiated with the UV light.

The intermediate unit 1123 of the transit unit 112 may be located between the input unit 1121 and the discharge unit 1122. The UV irradiation unit 111 may be located in the intermediate unit 1123.

Meanwhile, the UV irradiation unit 111 may be provided in plural so as to be adjacent to each other. The intermediate unit 1123 may be provided with a plurality of piece-shaped partition wall units 1231 on the inner circumferential surface.

The partition wall unit 1231 may allow the organic waste liquid input on the inner circumferential surface of the intermediate unit 1123 to stagnate in the intermediate unit 1123. Accordingly, the time, during which the organic waste liquid is exposed to the UV light, can be extended.

As described above, the partition wall unit 1231 may be arranged so that the separation state of the partition wall unit 1231 gradually narrows from the input unit 1121 side toward the discharge unit 1122 side. This is to consider the pressure when the flow rate is introduced from the input unit.

The buffer tank 120 may perform circulation operation with the transit unit 112. The buffer tank 120 may be input with the organic waste liquid irradiated with the UV light.

The buffer tank 120 may increase the frequency of exposure of the organic waste liquid to the UV light on the transit unit 112 by inputting the input organic waste liquid into the transit unit 112.

The analysis unit 115 may obtain a total organic carbon (TOC) analysis value of the organic waste liquid on the transit unit 112. Here, the circulation operation may be repeated until the analysis value reaches a preset value.

At this time, the total organic carbon (TOC) analysis through the analysis unit 115 is provided at the front and rear ends of the UV reactor 110, the UV irradiation unit 111, and the transit unit 112 to perform analysis, respectively. Specifically, the analysis unit 115 may be provided on the input unit 1121 side and the discharge unit 1122 side, respectively, to perform analysis.

The first flow path P1 may communicate with the filter unit 130 through the second flow path P2 and may communicate with the buffer tank 120. The filter unit 130 may filter the organic waste liquid supplied from the first flow path P1.

In addition, the filter unit 130 may supply the filtered organic waste liquid to the transit unit 112. The third flow path P3 may supply the organic waste liquid from the filter unit 130 to the transit unit 112.

The fourth flow path P4 may supply the organic waste liquid to the transit unit 112 and the buffer tank 120. The fifth flow path P5 may supply the organic waste liquid from the buffer tank 120 to the transit unit 112. The sixth flow path P6 may supply the organic waste liquid from the buffer tank 120 to the first flow path P1.

The pump PM is for pumping the organic waste liquid supplied from the buffer tank 120 to the transit unit 112.

Although the embodiments of the present invention have been described with reference to the above and the accompanying drawings, those skilled in the art, to which the present invention pertains, will understand that the present invention can be practiced in other specific forms without changing the technical spirit or essential features. Therefore, the embodiments described above should be understood as illustrative in all respects and not limiting.

What is claimed is:

1. A UV reaction apparatus for treating organic waste liquid caused by system decontamination in a nuclear power plant comprising:

a UV irradiation unit for irradiating UV light as a bar-shaped body; and a transit unit accommodating the UV irradiation unit therein, and for passing the organic waste liquid to be irradiated with the UV light, wherein the transit unit comprises, an input unit, into which the organic waste liquid is input, a discharge unit, through which the organic waste liquid is discharged, and an intermediate unit located between the input unit and the discharge unit in a height direction, and in which the UV irradiation unit is located, wherein a plurality of piece-shaped partition wall units are provided on an inner circumferential surface of the intermediate unit, a separation state in the height direction between individual piece-shaped partition wall units of the plurality of piece-shaped partition wall units is arranged so as to gradually narrow in a direction from the input unit towards the discharge unit.

2. The UV reaction apparatus of claim 1, wherein the UV irradiation unit is provided in plural so as to be adjacent to each other, wherein the plurality of piece-shaped partition wall units allow the organic waste liquid input on the inner circumferential surface of the intermediate unit to stagnate in the intermediate unit so that time, during which the organic waste liquid is exposed to the UV light, is extended.

3. The UV reaction apparatus of claim 1 further comprises, a buffer tank for performing circulation operation with the transit unit, wherein the buffer tank, into which the organic waste liquid irradiated with the UV light is input, inputs the organic waste liquid into the transit unit to increase frequency of exposure of the organic waste liquid to the UV light on the transit unit.

4. The UV reaction apparatus of claim 3 further comprises, an analysis unit for obtaining a total organic carbon (TOC) analysis value of the organic waste liquid on the transit unit, wherein the circulation operation is repeated until the TOC analysis value reaches a preset value.

5. The UV reaction apparatus of claim 4, wherein the analysis unit is provided on a side of the UV reaction apparatus including the input unit and a side of the UV reaction apparatus including the discharge unit, respectively, to perform analysis.

* * * * *